United States Patent [19]
Herbert

[11] 3,885,212
[45] May 20, 1975

[54] SECTOR FLUX NULL CURRENT MEASURING APPARATUS AND METHOD

[75] Inventor: William L. Herbert, Columbus, Ohio

[73] Assignee: Halmar Electronics, Inc., Columbus, Ohio

[22] Filed: Apr. 5, 1973

[21] Appl. No.: 348,272

[52] U.S. Cl.............................. 324/117 H; 324/45
[51] Int. Cl..................... G01r 19/00; G01r 33/06
[58] Field of Search....... 324/117 H, 117 R, 45, 127

[56] References Cited
UNITED STATES PATENTS

| | | | |
|---|---|---|---|
| 2,709,800 | 5/1955 | Temple et al. | 324/127 |
| 2,836,791 | 5/1958 | Kaplan | 324/117 |
| 3,422,351 | 1/1969 | Pihl | 324/117 H |
| 3,525,041 | 8/1970 | Velsink | 324/117 H |
| 3,573,616 | 4/1971 | Kahen | 324/117 H |

OTHER PUBLICATIONS
Grubbs; W. J., "Hall Effect Devices," The Bell System Tech. Jour., May 1959, pg. 853–876.
Shields; J. P., "Hall Effect in Solid," Radio–Electronics, July 1968, pgs. 42–45, 93.

Primary Examiner—Alfred E. Smith
Assistant Examiner—Ernest F. Karlsen
Attorney, Agent, or Firm—Wood, Herron & Evans

[57] ABSTRACT

A high current measuring apparatus and method is disclosed. In very high current applications, such as in the manufacture of chlorine gas, a measurable field is established around a current-carrying bus. A field-measuring device, such as a Hall device, is located within the field surrounding the current-carrying bus. This field-measuring device is disposed between two field-concentrating elements which concentrate the field passing through the device. Electrical signals from the field-measuring device are amplified by a high-gain amplifier whose output is applied to coils wound around the field-concentrating elements. The current in these coils is operative to reduce or to null the field passing through the field-measuring device. The steady-state current in these coils is proportional to the current in the bus. By passing a known current through the bus or by measuring an unknown current with another already calibrated current-measuring device, the measured coil current can be directly calibrated to bus current. After calibration, the previously calibrated current-measuring device is removed.

5 Claims, 4 Drawing Figures

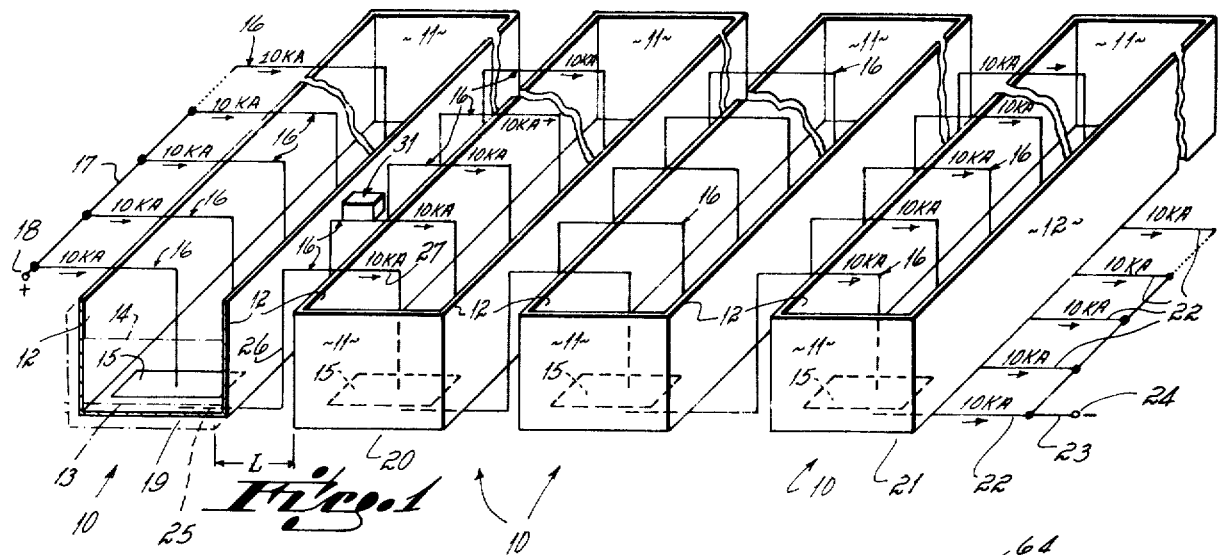
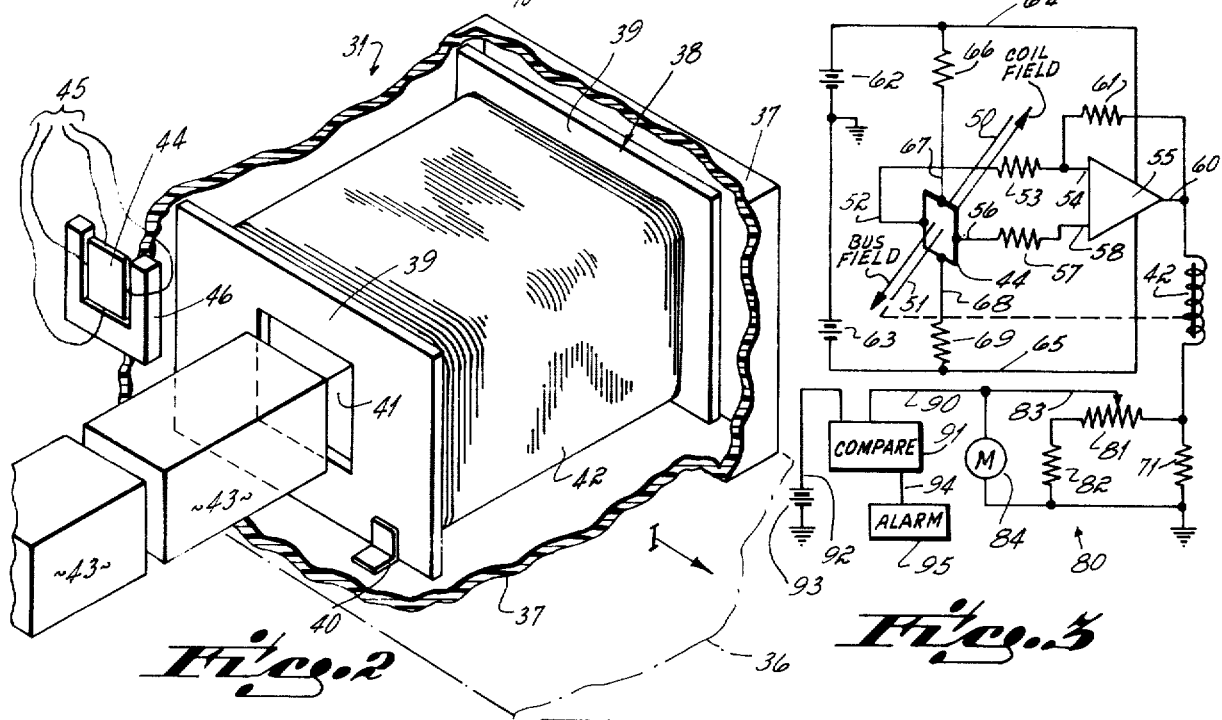
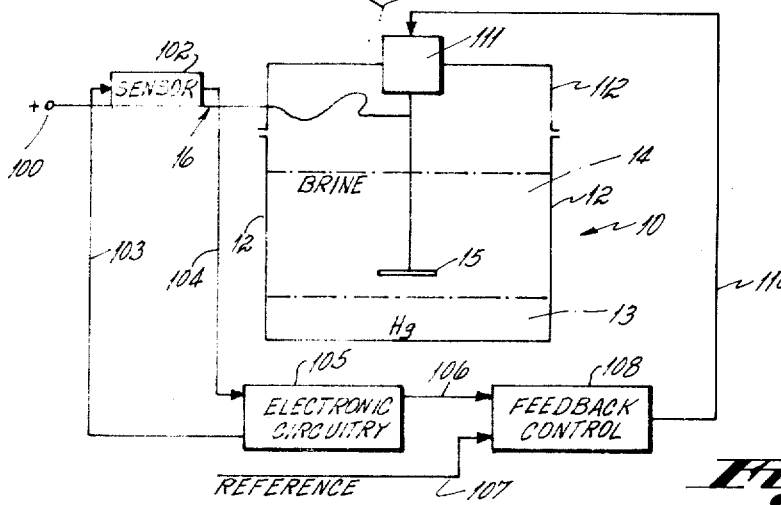

SECTOR FLUX NULL CURRENT MEASURING APPARATUS AND METHOD

This invention relates generally to the field of current measurement and particularly to the field of current measuring in applications not well suited for conventional current-measuring techniques.

One field which is not well suited to traditional current-measuring techniques is high amperage electrochemical processes utilizing multiple electrodes such as is found in the manufacture of chlorine gas. Typically, chlorine gas is produced in a chlorine cell which comprises an enclosed tank (cover not shown) which may be 60 feet long, 4 feet wide and at least several feet deep. In most industrial chlorine gas manufacturing plants, there are a plurality of such tanks arranged in closely spaced rows. By permitting electrical current to flow through a brine solution in each cell, chlorine gas is released and collected from above the brine solution in each cell.

In typical industrial chlorine manufacturing plants, there may be as much as 250,000 amperes of current flowing through each cell. This current is usually distributed throughout the cell by a plurality of anodes connected by individual currentconducting buses. Furthermore, the anodes in successive cells are in a series connection with other cells. As such, all of the anodes in each cell are series connected to another cell to form a large electrical network which must be controlled to assure efficient system operation.

For most efficient operation, the current should be distributed evenly among all the anodes. Consequently, it is desirable to have current-measuring apparatus to measure the current in each of the anode circuits. For typical industrial chlorine manufacturing facilities which may include as many as twenty-four current-carrying buses connected to the anodes of each cell, there must be twenty-four current-measuring apparatus associated with each cell. Furthermore, since each such current-carrying bus must conduct approximately 10,000 amperes of current, each associated current-measuring apparatus must be capable of measuring currents of this large magnitude.

In typical chlorine gas cell operation, it has been found that impurities form in the cell which are by-products of the cell chemical reactions. These impurities frequently collect together in a mass to form a substance which may cause a short circuit between one anode and the cathode of the chlorine cell. When this occurs, all of the current flowing through a given cell will tend to pass through the current-carrying bus connected to the short circuited anode. Consequently, a very high current passes through a single bus and also through a single electrically connected anode. When this situation occurs, the anode is frequently destroyed by the high current passing therethrough. This destruction of a cell anode is very costly because the cell will no longer produce chlorine gas efficiently and the anode, which is quite expensive, must be replaced.

It has also been noted, although no satisfactory explanation has been suggested, that when one cell in a bank of series-connected cells become short circuited, the current distribution in an adjacent cell is affected, frequently to the extent of causing a similar short circuit in an adjacent cell. Consequently, a failure within one cell may ripple through other cells and drastically reduce the overall chlorine production of the facility without proportionally reducing the electrical power usage.

These difficulties in cell operation are difficult to detect because current in typical chlorine cell facilities is usually only measured at the system input or output. In some cases, by careful observation of the system current, an anode short condition can be detected but it cannot be located with simple current-measuring devices, such as a single meter located on the system input power bus. The short circuited anode can only be detected and located by providing a current-measuring apparatus at each bus.

From the foregoing analysis, it is clear that many of the operational problems in chlorine cells can be detected if the current in each anode can be measured. Since the anode current is very large, in the order of 10,000 amperes, most simple current-measuring devices would be inoperative. There are, however, many sophisticated current-measuring devices which can measure such large currents.

One such current-measuring device has been described in U.S. Pat. No. 3,323,056. This device includes a field-sampling apparatus for completely encircling a current-carrying bus. Devices of this type include a large field-sensing head which must be positioned completely around the current-carrying conductor. By appropriate field-sampling means, the field which extends completely around the current-carrying conductor is measured and the field amplitude can be easily calibrated to provide a direct measurement of the current within the conductor.

While the device described in U.S. Pat. No. 3,323,056 is suitable for measuring currents of the magnitude entering a single chlorine cell of the type described, such apparatus is not suitable for measuring the current flowing into each cell anode in an industrial chlorine manufacturing plant because the field-sensing head is physically quite large and, therefore, is impossible to install on intercell-connecting buses because the cells are arranged in closely spaced rows. Consequently, current-measuring devices of the type described in U.S. Pat. No. 3,323,056 have application only for measuring the current as it enters or leaves the plurality of series-connected cells and cannot be used for measuring the current in any intercell current-conducting bus connected to a single anode.

In addition to the foregoing difficulties related in using the current-measuring devices of the type described in U.S. Pat. No. 3,323,056, the economics of using a plurality of such devices is frequently prohibitive because such devices are quite expensive. In fact, if devices of this type were to be considered for measuring current in twenty-four currentcarrying buses of the type and character described for the manufacture of chlorine, it is likely that the initial cost of this instrumentation would not be justified despite the increased operating efficiency of the facility due to better control over current distribution among the cell anodes.

In order to overcome the difficulties in utilizing devices of the type described in U.S. Pat. No. 3,323,056, various other current-measuring approaches have been attempted in an effort to provide an accurate and economical current-measuring device adapted for use with the multi-bus circuit of a chlorine cell. One such approach is the bus tap which employs a pair of electrical connection points spaced longitudinally along a current-carrying bus. When current passes through the bus, a voltage drop occurs longitudinally along the length of the bus between the two electrical connection points. By connecting a high grain voltage sensing device, such as a VTVM, the voltage between the two electrical connectors can be measured. By knowing the dimensions and resistance of the bus, the voltage thus measured can be calibrated to directly indicate the current flowing in the bus.

While the bus tap approach is advantageous because it is relatively inexpensive, this approach does have a number of difficulties. In the first place, since the measurement of current depends on a voltage drop along a predetermined length of a current-carrying bus, the accuracy of the bus tap approach is affected by the temperature of the bus. Since the electrical resistance of a conductor, such as aluminum or copper, will vary with temperature, the bus tap approach will frequently result in greater than five per cent inaccuracy. A further difficulty with the bus tap approach is that the current-measuring device is not electrically isolated from the bus itself. Thus, for safety reasons, additional circuitry is necessary to insure against electrical shocks to operators and to prevent the possibility of short circuits developing between one current-measuring device and another.

With the foregoing difficulties in mind, it is a primary object of this invention to provide a current-measuring apparatus and method of high accuracy for measuring a large current in a current-carrying bus located in such proximity to non-conducting bodies as to prevent the installation of accurate current-measuring devices known in the prior art.

It is a further object of this invention to provide a current-measuring apparatus wherein each such measuring apparatus is considerably less expensive than prior art devices of similar accuracy.

It is still a further object of this invention to provide a current-measuring apparatus wherein such apparatus is electrically isolated from the current being measured.

It has been another objective of the invention to provide an economical system for measuring currents in a conductor which is located in large extraneous fields from other nearby conductors or other field sources wherein an inexpensive device is permanently mounted on the conductor, and is thereafter calibrated to the current in the conductor by another previously calibrated precision instrument installed only temporarily for calibration purposes.

It is a further objective of this invention to provide a current-measuring apparatus responsive to the field generated by the current being measured, the current-measuring apparatus being easily positioned in minimize measurement errors due to other presence of extraneous fields.

It has been a further objective of the invention to provide a current-responsive apparatus for automatically controlling the anode to cathode spacing in an electrolytic cell and thereby to automatically control the cell operation and prevent short circuit destruction of cell anodes.

In the prior art devices of the type described in U.S. Pat. No. 3,323,056, the field generated around a current-carrying conductor is completely sampled by a field-sampling head which completely encircles the conductor. As such, the current-measuring device of this type can be calibrated in advance of its installation as the current-measuring technique is independent of its physical installation. The present invention, however, departs significantly from this prior approach. In accordance with the present current-measuring approach, a single field-sensing device, such as a Hall device, is located in a fixed relationship to a current-carrying conductor so that the field produced thereby when a current flows therethrough will pass through the field-measuring device. A pair of field-concentrating poles of, for example, ferromagnetic material, are normally disposed on opposite sides of the field-measuring device. These poles will tend to increase the magnitude of the field passing through the field-measuring device due to currents in the bus being measured. The field-measuring device itself produces an electrical signal which is proportional to the magnitude of the field passing therethrough. This electrical signal is amplified by a high gain amplifier whose output is connected to a coil wound around the field-concentrating poles. The amplifier and the coil are connected in order that the current flowing in the coil will produce a field in the field-concentrating poles which is opposite to the direction of the field produced by the current-carrying conductor. A steady-state current will be produced in the coil and this current is proportional to the current flowing in the conductor. In order to calibrate this current-measuring device, the current is first measured by another calibrated current-measuring device of the type described in U.S. Pat. No. 3,626,291 and the corresponding coil current is noted. This noted current corresponds to the measured current in the bus. As such, this current-measuring device responds to only a sector of the flux path surrounding the current-carrying bus to produce an accurate measure of the current in the bus.

The foregoing objects, features and advantages of the present invention will become more clear from the following detailed description taken in connection with the following drawings which form a part of the disclosure wherein:

FIG. 1 is a schematic, perspective view of a plurality of chlorine cells electrically wired together to form an electrical network for which the current-measuring apparatus and method of the present invention is particularly well suited;

FIG. 2 is an exploded diagrammatic, perspective view of the current-sensing element;

FIG. 3 is a schematic diagram of the current-sensing apparatus of this invention; and FIG. 4 schematically represents an apparatus for automatically controlling the operation of a chlorine cell in response to current measurements made by the current-measuring apparatus of FIG. 3.

Referring now to FIG. 1, a plurality of chlorine cells 10 are shown in parallel-spaced relation. Each tank includes a pair of end walls 11, a pair of elongated side walls 12 and a bottom wall, all of these walls being formed of an electrical conductive material and positioned in the manner shown to form an enclosed tank (cover not shown). In a typical installation, the end walls 11 are disposed in parallel relation and may be located as much as 60 feet apart. The side walls 12 are also located in parallel relation and are typically located approximately 4 feet apart. The height of the tank is somewhat variable from installation to installation although tank heights ranging from two to four feet in depth are quite common.

Each chlorine cell 10, in typical installations, is disposed such that the bottom wall of each cell 10 is slightly inclined to the horizontal along the longitudinal axis of the bottom wall. As a consequence, the bottom of the cell 10 slopes from one end member 11 to the other. This will permit a mercury layer 13 to flow by gravity from one end of the tank to the other. Normally, a mercury source is provided at the elevated end of the cell 10 and a drain is provided at the lower end of the cell 10 in order that a flowing and substantially uniform thickness layer of mercury can be provided at the bottom of each cell 10 which forms the cell cathode.

Located above the mercury layer, 13, is a brine solution 14. The brine solution 14 is the chemical reactant from which chlorine gas is liberated in normal cell operation. As such, the volume of the brine solution is depleted by the reaction within the chlorine cell and a source of brine solution, not shown, is usually provided to maintain the level of the brine solution 14 within each cell 10.

Positioned longitudinally along each cell and completely disposed within the brine solution 14 are a plurality of anodes 15, each of which is supported from above and electrically connected to a current-carrying bus 16. Each anode 15 is shown diagrammatically as a planar body located within the brine solution 14 and disposed in parallel-spaced relation to the mercury later 13 at the bottom of each cell 10. While each anode 15 may comprise a planar body as shown, this planar structure is merely shown for diagrammatic purposes and is not intended to describe all possible anode structures in a chlorine cell 10. In fact,, any anode structure imaginable may be substituted for anode 15 as shown, however, the resulting chlorine yield from the cell 10 may be greater or lesser than that for the planar body shown. In typical chlorine cells 10, the anode 15 is supported from above and spaced approximately two millimeters above the mercury layer 13 when the cell itself is operating most efficiently.

The number of anodes within a typical cell 10 of the dimensions already described is approximately 24 although this may vary from installation to installation according to the actual shape and other physical characteristics associated with a given anode 15. In the installation as described, however, there will be 24 current-carrying buses 16 electrically connected to a main current-carrying bus 17 which itself is connected at terminal 18 to a positive source of electrical current. In a typical industrial plant using chlorine cells of the type described, the positive current source must supply enough electrical power to the main bus 17 so that each connected current-carrying bus 16 will be able to carry approximately 10,000 amperes of current to each connected anode 15. This current distribution, however, is merely descriptive of typical chlorine cells and is not intended to be inclusive of all chlorine cell operation. However, it has been found that most efficient operation is maintained when the current traveling to each of the anodes is maintained at a level approximating that at the other anodes in the cell.

For electrical power efficiency reasons, it has been found that it is most efficient to arrange chlorine cells in a series electrical connection arrangement as shown in FIG. 1. The first series-connected cell 19 is connected as generally described above. However, the second series-connected cell 20 is not directly connected to the main power source at terminal 18. Each current-conducting bus 16 associated with the second series-connected cell 20 is connected electrically to the bottom wall of the cell 19 at a point physically adjacent an anode 15 within the first cell 19. While the mercury later within the first cell 19 provides a substantially constant voltage plane in contact with the bottom wall of the cell 19, even current distribution in each of the current-carrying buses 16 entering cell 20 is better maintained if each of the buses 16 is connected to the bottom wall of the cell 19 at a physical position adjacent a corresponding anode within cell 19 as shown by way of example at the free end of the dotted line 25. As such, the physical location of the electrical connection via the current-carrying buses 16 between the cell 19 and the cell 20 assists in maintaining a current flow balance such that each anode 15 within cell 20 will receive approximately 10,000 amperes of current through bus 16 connected thereto.

The last of the series-connected cells 21 includes a plurality of current-carrying buses 22 which are electrically connected to a main current-carrying bus 23 which itself is connected at terminal 24 to the negative current supply for all the chlorine cells 10. In its preferred operation, the electrical network between the positive terminal 18 and the negative terminal 24 is a balanced network such that each anode disposed within each chlorine cell 10 will receive approximately 10,000 amperes of current from each electrically connected current-carrying bus 16. Under such optimum conditions, the reaction occurring within each cell causes a liberation of chorine gas in the region between each anode 15 and the mercury layer 13, the cell cathode. This chlorine gas is collected from above the brine solution 14 and stored remotely in gas storage containers.

During the normal operation of the chlorine cell, certain impurities within each cell react to form chemical impurities which form globules of material that may collect between the anode and the mercury layer in the cell. This impurity material frequently causes a short circuit to occur between an anode and the mercury layer. As such, the short circuited anode is no longer operative to liberate chlorine gas and it will aslo cause a redistribution of current within the cell so that all the current will pass through the short-circuited anode, causing the whole cell to cease chlorine production and frequently destroying the short circuited anode.

Because short circuit conditions frequently occur within a chlorine manufacturing facility of the type described in FIG. 1, it is desirable to be able to detect and isolate these short circuit conditions as quickly as possible. Once they have been detected and isolated, a maintenance man can increase the spacing between the short-circuited anode and the mercury layer by raising the anode thereby freeing the impurity lodged between the anode and the mercury layer. By such adjustment of the anode-to-mercury layer spacing, a short-circuited chlorine cell can be readjusted to permit continued proper operation thereof.

In order to provide the current-detecting capabiliities for positive controlling of a chlorine cell network of the type shown in FIG. 1, a plurality of current-measuring devices must be provided and, ideally, such devices should be capable of providing to the operator an indication of the current flowing in each current-carrying bus 16. The physical placement of the chlorine cells 10, however, make such current measuring a difficult proposition because adjacent chlorine cells, such as cell 19 and 20, are normally positioned in closely spaced relation to each other, a distance L apart where L is typically a distance of less than one foot. This intercell spacing is sufficiently large that the bus 16 can project horizontally as shown at 25 from under the first cell 19 and then rise vertically as shown at 26 in spaced relation to the sides of cell 19 and cell 20 until it has reached a point higher than the upper edge of the cell 20. Then the current-carrying bus extends horizontally as shown at 27 to a point above the electrically connected anode 15 within the cell 20. While the current carrying buses 16 are shown diagrammatically in FIG. 1 as lines in a typical cell configuration of the type shown in FIG. 1, these buses 16 are comprised of a current-conducting material having cross-sectional dimensions of approximately 16 inches wide and one inch high. Since there are a plurality of parallel connected electrical-conducting buses 16 displaced longitudinally along the length of each chlorine cell 10 and since the buses 16 have typicall dimensions as described, the physical space between adjacent buses and also the space between the buses and the parallel side walls of adjacent cells is very small, making it impossible to install current-measuring devices of the type described in U.S. Pat. No. 3,323,056 along the current-conducting bus portion 16 between two adjacent cells.

As outlined generally above, there is a real need for a current-measuring device which is inexpensive, accurate and adaptable for use in chlorine cell applications or the like where ther are large fields produced by other current-carrying conductors. Devices such as those described in U.S. Pat. No. 3,323,056 provide an apparatus capable of measuring accurately the current in a bus despite the large fields produced by nearby current-carrying buses. Devices of the type described in the mentioned patent operate on the principal of integrating the field intensity over a closed contour around the conductor. By this integration, the effects of extraneous fields produced by other conductors or field sources are thus eliminated. These devices, as indicated above, are large in size and are not suitable for application in chlorine cells or the like.

The current-sensing means of the present invention, on the other hand, is physically much smaller than the sensing head described in the above-mentioned patent. In fact, the size of the sensing element of the present invention is small enough and of a type that may be located directly on a current-conducting bus 16 as shown diagrammatically at 31. The sensor at 31 will be described in greater detail later, however, it is of the type which responds to the field generated by a current flowing through the bus 16. Yet it does not sample the field completely around the conductor. As such, the current-measuring apparatus according to this invention cannot be calibrated prior to installation. Furthermore, since only one field sample is taken, the current-measuring apparatus is susceptible to inaccuricies due to the fields from current in adjacent conductors. However, the simple, inexpensive current-measuring apparatus of the present invention responds to the field changes generated by the bus to which it is attached and is relatively insensitive to changes of current in adjacent buses as will become more clear from the following more detailed description of the current-sensing apparatus shown in greater detail in FIG. 2.

The current-sensing device of this invention is shown in the exploded perspective view in FIG. 2 wherein the current-sensing device is secured directly to a current-carrying bus 36 which has a current I flowing therethrough in the direction as indicated by the arrow. The current-sensing device of the present invention preferably includes a case 37 formed of plastic or other electrical insulating material permitting the case 37 to be attached directly to the current-carrying bus 36. Because the case 37 is formed of electrical insulating material, the current-sensing apparatus of this invention, which is located within the case, is electrically isolated from the current flowing in the bus 36. The sensing device itself includes a coil form 38 which has a pair of parallel spaced end plates 39 joined by a tubular member 41. The coil form is anchored to the case by suitable anchoring means 40 which may take the form of angle brackets and screws or other suitable attachment means to fixedly locate the coil form 38 within the case 37. As will be described later, the case 37 is secured directly to the current-carrying bus 36 in a manner to assure that the axis passing through the tubular mamber 41 is disposed in perpendicular relation to the direction of current flow in the bus 36.

Wound around the outside of the tubular member 41 and between the two end plates 39 is an electrical coil 42 which is used, as will be described later, to produce a field which passes through the tubular member 41 in a direction opposite to the field created by the current I flowing in the bus 36. Disposed within the tubular member 41, althouggh shown in FIG. 2 in exploded relation, are a pair of magnetic field-concentrating poles 43 comprised of a magnetic material for concentrating the field flux in the sector being sampled, a sector comprising a segment of a continuous contour around the current-carrying bus. Normally disposed between the adjacent faces of the magnetic field-concentrating poles 43 is a magnetic field-sensing device 44 such as a Hall effect device normally includes four electrical conductive leads 45 which are positioned between one of the magnetic field-concentrating poles 43 and the inner surface of the tubular member 41 and extend out of the tubular member 41 to permit the field-sensing device 44 to be electrically connected to the electronic circuitry necessary to measure the current I in the bus 36. The field-sensing device 44 is located in a suitable clamping means 46 designed to secure the field-sensing device 44 in position between the two field-concentrating poles 43. The holding device 46 is shaped to secure the field-sensing device 44 along the magnetic axis of the field-concentrating poles 43 and has a thickness sufficient to prevent the adjacent faces of the field-concntrating poles 43 from contacting the field-sensing device 44 should they be displaced along the magnetic axis during shipment of the device or by mechanical vibrations experienced in normal operation thereof.

In normal operation, the field-sensing device as shown in FIG. 2 is fixedly located in a magnetic field developed by the current I passing through the bus 36, the sensing device being located so that the field will pass through the field-concentrating poles 43 in a direction parallel to the longitudinal axis of the tubular member 41. Because the field-concentrating poles 43 are of a magnetic conducting material, a larger percentage of the magnetic field created by the current in the bus 36 will be concentrated along the pole axis than would pass through the device 44 without the poles 43 and this field will pass through the magnetic sensing device 44. As will be described in greater detail later, the electronic circuitry connected to the field-sensing device 44 will produce a current which flows through the coil 42 in a direction to produce a magnetic field along the axis of the tubular member 41 in a direction which is opposite to that produced by the current flowing in the bus 36. The current producing this opposite field in the coil 42 is proportional to the current flowing in the bus 36 and can be calibrated, as will be indicated later, so as to directly indicate the magnitude of the current I in the bus 36.

Since current-sensing devices of the present invention are particularly designed for measuring currents in a bus which comprises one of a plurality of parallel buses in chlorine cell configurations of the type shown in FIG. 1, advantageously the field-sensing device 44 comprises a planar construction positioned so that the field produced by an adjacent current-carrying bus 36 passes through this planar construction in a direction substantially perpendicular to its plane. Because of the parallel configuration of adjacent current-conducting buses and the carefully selected positioning of the field-sensing device, the field produced by current flowing in adjacent buses will pass through the field-sensing device 44 in a direction substantially parallel to the plane of the field-sensing device itself. As a consequence, variations in the current of adjacent current-conducting buses will have a relatively small effect on the measured current because the field-sensing device is not responsive to changes in magnetic fields which are parallel to the plane of the magnetic field-sensing device.

Referring now to FIG. 3, a schematic diagram of the electronic circuitry for the current-measuring device of the present invention is shown. The magnetic field-sensing device 44 is shown with a bus-generated field shown diagrammatically by arrow 50 and a coil-generated field shown diagrammatically by an arrow 51 passing therethrough. One field-sensing device electrical connector 52 is connected in circuit with an input resistor 53 to one input 54 of a high gain operational amplifier 55. The opposite electrical connection 56 on the field-sensing device 44 is connected in circuit with a second input resistor 57 to a second operational amplifier input 58. The operational amplifier 55 is itself connected in a feedback configuration such that the output terminal 60 is connected via a feedback resistor 61 to the input terminal 54. In this configuration, the input resistors 53 and 57 combined with the feedback resistor 61 are operational to define the gain of the operational amplifier 55. In a typical configuration, the input resistors 53 and 57 might be 25 ohm resistors and the feedback resistor 51 might be 75,000 ohm resistor. In such a configuration, the gain of the operational amplifier in the feedback configuration as shown will be approximately 3,000.

Two direct current power supplies 62 and 63 are provided with the negative terminal of supply 62 and the positive terminal of supply 63 connected directly to ground. The positive terminal of the supply 62 is connected via the conductor 64 to the positive supply terminal for the operational amplifier 55. The negative terminal of the supply 63 is connected via the wire 65 to the negative power supply terminal of the operational amplifier 55. The positive lead 64 of the power supply 62 is also connected to a resistor 66 which is connected in circuit to another field-sensing device lead 67. The opposite lead 68 to the lead 67 is connected in circuit with a resistor 69 to the negative power terminal from supply 63. As such, a direct current path is created from the power supply 62 through the resistor 66, through the field-sensing device 44, through the resistor 69 to the negative terminal of the power supply 63, the current flowing therethrough being necessary to operate the field-sensing device.

In operation, as the bus-created field, indicated by arrow 50 passing through the field-sensing device 44, increases in magnitude, a signal is created between the leads 52 and 56 which causes the operational amplifier 55 to produce a signal at the output 60 which increases the magnitude as the field passing through the field-sensing device increases. The output terminal 60 of the operational amplifier 55 is connected in series with the coil 42 and an output resistor 71. As the signal at the output terminal increases with an increasing bus-created field through the field-sensing device 44, a current will pass through the series-connected coil 42 and the output resistor 71 and thereby produce a field along the axis of the coil 42. By proper electrical connection of the operation amplifier to the coil 42, the current passing through the coil 42 can be made to produce a field which passes through the field-sensing device 44 in a direction opposite to the bus-created field. This in indicated by the dotted line connecting the arrow 51 with the coil 42. As a consequence, the circuitry shown in FIG. 3 is opposite so that the bus-created field, indicated by arrow 50, is nulled by the coil-created field, as indicated by the arrow 51. In the steady state, the net field passing through the field-sensing device 44 will remain constant as a constant current will be passing through the coil 42 and the resistor 71. This latter current is proportional to the field strength created by the bus and, therefore, is proportional to the current I passing through the bus itself.

As already noted, the field generated by the coil 42 is in a direction opposite to the direction of the field produced by the bus current being measured. This coil-produced field is opposite in direction to the bus-produced field to assure that the field-concentrating poles do not become saturated due to the large field produced by the current in the bus. As such, by preventing saturation, the device will remain responsive to small current changes in the bus being monitored.

In order to measure the current in the coil 42, a current-measuring apparatus 80 is provided. This apparatus includes a variable resistor 81 and a fixed resistor 82 connected in series to form a net shunt resistance which is parallel connected with the output resistor 71. The output resistor 71 is typically in the magnitude of 4 ohms while the variable resistor 81 is approximately 2,000 ohms and the fixed resistor 82 is approximately 5,100 ohms. The variable tap 83 on the variable resistor 81 is connected to one lead of a volt meter 84 while the other lead of the volt meter 84 is connected to ground. As such, the voltage at the variable lead 83 can be adjusted by varying the setting of the variable resistor 81 so that the reading of the volt meter 84 can be adjusted to read directly the current flowing in the bus adjacent the field-sensing device 44.

In certain applications, the gain of the operational amplifier 55 may be insufficient to produce a current in the coil 42 of sufficient magnitude to permit accurate and calibratable operation of the current-measuring device. In such a situation, an additional amplifier, not shown, may be provided between the output 60 of the operational amplifier 55 and the connection to the coil 42 to thereby increase the current through the coil 42. The gain of such additional amplifier need only be sufficient to create enough current through the coil 42 and the resistor 71 to produce a measurable output when the current in the bus being measured is in its normal operation range. However, the gain must be large enough to produce sufficient current in the coil 42 to prevent saturation of the poles.

As indicated generally above, the current-measuring device described in FIGS. 2 and 3 cannot be calibrated in advance of installation because the field from the current-carrying bus is sampled in a sector and not over a closed contour around the bus. The present invention merely takes a single field sample which, in addition to the above failing, also leads to further possible inaccuracy due to extraneous fields being sampled in the sector. As such, the use of a single field-sensing device would appear to be a poor choice for measuring currents on closely spaced parallel current-conducting buses.

The apparent disadvantages of this invention are, however, of little real consequence and are overcome primarily by careful selection of the location for the field-sensing element 31. Preferably, the field-sensing element 31 is located in close proximity and normally directly on the bus which is to be measured. The field-sensing element 31 must be fixedly positioned in the bus-created field, otherwise the current measurements will not be accurate. Furthermore, the axis of the field-concentrating poles of this invention are advantageously aligned with the field produced by the bus, in preferred installations, because field-sensing devices such as Hall elements respond to the perpendicular component of the field passing through the Hall device. By such positioning, the magnitude of the sensible bus-created field is increased.

When current-measuring devices of this invention are used in chlorine cell applications or the like, they must be located where they are subject to large extraneous fields generated by currents in adjacent buses. As such, these current-measuring devices are subject to inaccuracy if the extraneous fields affect the field-sensing elements. This problem is overcomeable by careful placement of the field-sensing element 31 at a physical location where the fields from nearby current-carrying conductors are either cancelled out or will pass through the Hall device substantially parallel to the plane of the Hall plate. With such placement, the Hall device response to the extraneous fields is minimized. For chlorine cell applications, the field-sensing device is most advantageously located directly on the bus being measured at a point along the longitudinal midline of either the upper or lower surface for the horizontal bus portion 27. At either of these two locations, the field of adjacent and parallel current-carrying buses will be substantially parallel to the plane of a Hall element used in a field-sensing element 31 and, as such, these extraneous fields will have a minimal effect on the field sensed by the Hall element.

In accordance with the present invention, the apparatus shown in FIG. 3 is inherently uncalibratable because the magnitude of the field produced by the current in the bus as indicated by the arrow 50 cannot be accurately determined in advance because the device is very sensitive to the actual geometry of its positioning. Consequently, the apparatus of this invention must be calibrated after the field-sensing device 44 has been fixedly positioned with respect to the current-carrying bus for which current measurements are desired. The calibration of the device may be performed by passing a known current through the current-carrying bus adjacent the field-sensing device 44 or by passing an unknown current through the bus and measuring the current by some other current-measuring device as the device described in U.S. Pat. No. 3,626,291. In either case, the known current will produce a field to cause the operational amplifier to generatre a current through the coil 42. The coil current also passes through the output resistor 71 to produce a voltage thereacross which is measurable by the voltage-measuring device 80. By adjusting the variable tap 83 on the variable resistor 81, the voltage measured by the volt meter 84 may be varied so that the reading of this volt meter can be adjusted to be equal to the known current flowing in the current-conducting bus. Even greater accuracy of this meter calibrating technique can be achieved by noting the reading on the meter 84 which corresponds to other and different known currents passing through the current-conducting bus adjacent the field-sensing means 44. In this manner, a full range of readings for the meter 84 may be correlated to known currents. This latter step is not necessary where the current-measuring device is to be used for measuring current in buses such as those in chlorine cells as described in FIG. 1 because the current flowing in each bus during normal operation of the cells is approximately equal to the current flowing in any other bus and, when an abnormal condition occurs, the current flowing through a given short-circuited anode is drastically higher than under normal operation. As such, the meter indication on the meter 84 would be drastically different than that of normal operation and the operator would be able to readily identify the bus through which a short-circuit is flowing.

As an aid to operators, an alarm can be sounded when the current through a given bus exceeds some predetermined maximum value. Circuitry for providing this alarm includes an electrical wire 90 between a compare circuit 91 and the variable tap 83 of the variable resistor 81. The voltage on this line 90 can be compared with a reference voltage on a line 92 from a reference source 93 and, when the voltage on the line 90 exceeds that on line 92, the compare circuit 91 will produce an output on line 94 to activate an alarm 95, such as an electrical buzzer, bell or the like. In alternative form, the compare circuit may comprise a Schmit trigger which will produce an alarm actuating signal when the input to the trigger exceeds a predetermined voltage.

The current-measuring device of the present invention may have further application in the automated operation of a chlorine cell. Such automated operation can be achieved by the apparatus shown schematically in FIG. 4. In this application, the positive power terminal is connected to point 100 and the current therefrom will flow through a current-conducting bus 16. A sensor 102, of the type described in FIG. 2, is positioned directly on the bus 16 in order to measure the current therethrough. The sensor 102 is connected to the electronic circuitry for measuring the current in the bus 16 via leads 103 and 104 which symbolically replace the connection to the leads 52, 56, 67 and 68 in FIG. 3. The electronic circuitry 105, which corresponds to the circuits in FIG. 3, produces an output on line 106 whose magnitude is proportional to the magnitude of the current flowing in the bus 16 and corresponds to the signal on the line 90 as shown in FIG. 3. A reference voltage is applied on line 107 to the input of a feedback-control network 108. The feedback-control network responds to the output on line 106 and to the reference signal on line 107 to provide a signal at its output 110 for operating a bidirectional servo motor 111. The servo motor 111 is supported by a bracket means 112 above the brine solution 14 of a chlorine cell 10. Supported by and raised and lowered by the servo motor 111 is an anode 15 which is shown disposed within the brine solution 14 and positioned above and in parallel relation to the layer of mercury 13 at the bottom of the cell 10. Whenever the output on line 106 is greater than that on the reference line 107, the current passing through the bus 16 is greater than a predetermined reference value. Consequently, the feedback-control 108 responds to this condition and places a signal on the output line 110 to cause the servo motor 111 to raise the anode 115 away from the mercury layer 13. This will cause the current flowing in the bus 16 to drop and, when this current falls to a value producing a signal at output line 106 equal to the reference signal 107, the feedback-control 108 will respond by producing a signal on line 110 to stop the servo motor 111. On the other hand, if the output signal on line 106 should fall below the reference signal 107, the feedback-control 108 will respond to produce a signal on line 110 to cause the servo motor 111 to lower the anode 15 toward the mercury layer 13. This will cause the current flowing in the bus 16 to increase and result in an increasing output level on line 106. When the level on line 106 reaches the level of the signal on line 107, the feedback-control 108 will respond by producing a signal on line 110 to stop the servo motor 111. As such, the network shown generally in FIG. 4 is operative to control the positioning of the anodes 15 with respect to the mercury layer 13 in a chlorine cell and the necessity for manual intervention in the operation of these cells is eliminated for most adjustments of the anode positioning with respect to the mercury layer at the bottom of the cell. Thus, by careful selection of the reference signal, the chlorine cell can be adjusted to operate at maximum efficiency without human intervention.

While the foregoing description of a current-measuring apparatus and method has been described with particular emphasis on its application in chlorine cells, it will be readily apparent to those of skill in the art that current-measuring devices of the type described may also be used in the manufacture of aluminum or other refining processes using a great deal of electrical current. It will also be clear to those of skill in the art that the current-measuring apparatus of the present invention may also be used where current-measuring devices suited to measuring high currents might be used, such as in electrical power transmission networks and the like. The apparatus of the present invention, although well suited to environments in which the fields of adjacent current-conducting buses are present, may also have application where only a single current-carrying bus is present.

In addition to the above-mentioned further applications of the present invention, it will be apparent to those of skill in the art that certain modifications in form only may be readily made without departing from the spirit and scope of the present invention. For example, while a specific structure has been described for the field-sensing device, it is clear that the physical structure of this device can be greatly modified, yet the modified structure will produce the electrical signals required by the electronics to produce the same general operation as has already been described. In addition, it will be clear to those of skill in the art that the particular circuit values mentioned with respect to the electronic circuitry of FIG. 3 may also be modified without departing from the spirit and scope of the present invention as defined by the following claims.

What is claimed is:

1. A method of monitoring current in one of a plurality of adjacent buses which are carrying high amperage currents of unknowwn magnitudes and which are producing high extraneous fields of unknown magnitude around the bus to be monitored comprising the steps of:

locating a field-sensing element between two unconnected non-annular magnetic field-concentrating members;

fixedly positioning said field-sensing element and said magnetic field-concentrating members in the field produced by the current in the bus being monitored;

connecting said field-sensing element to a current-indicating apparatus;

temporarily applying a current-measuring device to the bus;

calibrating saud current-indicating apparatus against the current measured by said temporarily applied current-measuring device; and removed said temporarily applied current-measuring device.

2. The method of monitoring current of claim 1 wherein the step of fixedly positioning the field-sensing element additionally includes locating the field-sensing element adjacent the current-carrying bus being monitored at a point where the direction of the field created by the current being monitored is substantially normal to the direction of the field produced by other nearby current-carrying buses.

3. The method of monitoring current of claim 1 wherein the step of fixedly positioning the field-sensing element additionally includes locating the field-sensing element adjacent the current-carrying bus being monitored at a point where the direction of the field created by current being monitored is substantially normal to the direction of other extraneous fields.

4. An apparatus for measuring current in a bus comprising, in combination:

a field-sensing element for sensing the field at one point in space and producing a signal having a magnitude proportional to the field which passes there through and produced by the current being measured, said field-sensing element being fixedly located in the field produced by the current being measured at a point where fields produced by other conducting buses are substantially perpendicular to the field produced by the current being measured;

a pair of unconnected non-annular field-concentrating members located on opposite sides of said field-sensing means for concentrating only a sector of the field produced by the current being measured;

an electrical conducting coil wound around said field-concentrating members, said coil surrounding said field-sensing element and field-concentrating members on both sides of said field-sensing element;

an amplifier means electrically responsive to said signal from said field-sensing element for producing an amplified signal at the output of said amplifier;

means for connecting said amplifier output to said coil to produce a field in said field-concentrating members in a direction opposite the field produced by the current being measured; and means to measure said amplified signal, the magnitude thereof being proportional to the current being measured.

5. A method of monitoring current in one of a plurality of adjacent buses which are carrying high amperage currents of unknown magnitudes and which are producing high extraneous fields of unknown magnitude around the bus to be monitored comprising the steps of:

locating a field-sensing element between two unconnected non-annular magnetic field-concentrating members;

fixedly positioning said field-sensing element and said magnetic field-concentrating members in the field produced by the current in the bus;

connecting said field-sensing element to an amplifier for producing a signal, said signal being used to generate a field in a direction opposite to the direction of the field at the field-sensing element generated by the current in the bus being monitored;

measuring said signal;

temporarily applying a current-measuring device to the bus;

calibrating said measured signal against the current measured by said temporarily applied current-measuring device; and removing said temporarily applied current-measuring device.

* * * * *